United States Patent
Chi et al.

(10) Patent No.: US 10,976,555 B1
(45) Date of Patent: *Apr. 13, 2021

(54) WAVEGUIDE DISPLAY WITH GRATINGS FOR IMPROVED DIFFRACTION EFFICIENCY

(71) Applicant: Facebook Technologies, LLC, Menlo Park, CA (US)

(72) Inventors: Wanli Chi, Sammamish, WA (US); Hee Yoon Lee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,113

(22) Filed: Nov. 27, 2019

Related U.S. Application Data (63) Continuation of application No. 15/727,873, filed on Oct. 9, 2017, now Pat. No. 10,534,176.

(51) Int. Cl.
*G02B 27/01* (2006.01)
*G02B 27/00* (2006.01)
*F21V 8/00* (2006.01)

(52) U.S. Cl.
CPC ....... *G02B 27/0172* (2013.01); *G02B 6/0016* (2013.01); *G02B 6/0036* (2013.01); *G02B 6/0055* (2013.01); *G02B 27/0081* (2013.01); *G02B 2027/0125* (2013.01); *G02B 2027/0178* (2013.01)

(58) Field of Classification Search
CPC .......... G02B 27/0172; G02B 6/0055; G02B 6/0016; G02B 6/0036; G02B 2027/0178; G02B 2027/0125; G02B 27/0081

See application file for complete search history.

(56) References Cited

U.S. PATENT DOCUMENTS

| | | | |
|---|---|---|---|
| 10,534,176 B1* | 1/2020 | Chi | G02B 6/0016 |
| 2005/0002611 A1* | 1/2005 | Levola | G02B 27/0081 385/37 |
| 2013/0314789 A1 | 11/2013 | Saarikko et al. | |
| 2013/0329301 A1 | 12/2013 | Travis | |
| 2016/0116739 A1* | 4/2016 | TeKolste | G02B 6/0025 385/36 |
| 2017/0131552 A1* | 5/2017 | Yokoyama | G02B 6/0035 |
| 2017/0199384 A1 | 7/2017 | Yeoh et al. | |
| 2018/0299678 A1 | 10/2018 | Singer et al. | |

FOREIGN PATENT DOCUMENTS

WO WO-2017102795 A1 * 6/2017 ........... G02B 6/0026

* cited by examiner

*Primary Examiner* — Kimberly N. Kakalec
(74) *Attorney, Agent, or Firm* — Fenwick & West LLP (57) ABSTRACT

A waveguide display is used for presenting media to a user. The waveguide display includes a light source assembly, an output waveguide, and a controller. The light source assembly projects an image light at least along one dimension. The output waveguide includes a waveguide body with two opposite surfaces. The output waveguide includes an input area, an output area, a first diffractive element on the first side, and a second diffractive element on the second side of the output waveguide. The output area is located between the input area and the first and second diffractive elements. The first and second diffractive elements reflect a second portion of the expanded image light back toward the output area for outcoupling to the eyebox. The controller controls the scanning of the light source assembly to form a two-dimensional image.

17 Claims, 5 Drawing Sheets

FIG. 5 ary for outcoupling to the eyebox. The controller generates and
provides display instructions to at least one of the light
source assembly and the source waveguide.

WAVEGUIDE DISPLAY WITH GRATINGS FOR IMPROVED DIFFRACTION EFFICIENCY

CROSS REFERENCE TO RELATED APPLICATIONS

This application is a continuation of co-pending U.S. application Ser. No. 15/727,873, filed Oct. 9, 2017, which is incorporated by reference in its entirety.

BACKGROUND

The disclosure relates generally to near-eye-display systems, and more specifically to waveguide displays with metal coated gratings for reflecting an incident light.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. In typical NEDs, when the image light from the display element is coupled into a pupil expander located inside the NEDs, at least one fifth of the incident image light is not diffracted and eventually gets absorbed by the surface of the waveguide body. Accordingly, conventional NEDs suffer from lower density of pupil replication as most of the incident image light gets wasted while propagating through the waveguide body. Furthermore, such NEDs also suffer from rainbow artifacts in the viewable media presented through such NED systems.

SUMMARY

A near-eye display (NED) is used for presenting media to a user. The NED may be part of, e.g., a virtual reality (VR) system, an augmented reality (AR) system, a mixed reality (MR) system, or some combination thereof. The NED includes a light source assembly, an output waveguide, and a controller. The light source assembly emits image light that is at least partially coherent. The output waveguide receives the image light emitted from the light source assembly and outputs an expanded image light to an eyebox (e.g., a location in space occupied by an eye of a user of the near-eye display). The controller generates display instructions to the light source assembly to form a two-dimensional image. In some embodiments, the waveguide display includes a source waveguide that receives the image light from the light source assembly along a first dimension and expand the emitted image light along a second dimension orthogonal to the first dimension.

Light from the light source assembly is in-coupled into the output waveguide through an input area at a first location on a surface of the output waveguide. The output waveguide includes a waveguide body that has a first side and a second side opposite to the first side. The input area receives the image light emitted from the light source assembly at the first location on a surface of the output waveguide.

The output waveguide expands the image light at least along two dimensions as light propagates within the waveguide between the first and second side. The output waveguide includes an output area that outputs a first portion of the expanded image light to an eyebox. The output waveguide includes a first diffractive element on the first side and a second diffractive element on the second side of the output waveguide, and the output area is located between the input area and the first and second diffractive elements. The first and second diffractive elements reflect a second portion of the expanded image light back toward the output area for outcoupling to the eyebox. The controller generates and provides display instructions to at least one of the light source assembly and the source waveguide.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A near-eye display (NED) includes a waveguide display. The NED may be part of, e.g., a virtual reality (VR) system, an augmented reality (AR) system, a mixed reality (MR) system, or some combination thereof. The waveguide display includes a light source assembly, an output waveguide, and a controller. The light source assembly generates image light that is at least partially coherent. The expanded image light is then coupled to an output grating which expands the image light in one or more dimensions before out-coupling the light toward an eyebox.

The output waveguide includes a waveguide body that has a first side (e.g. top) and a second side (e.g. bottom) opposite to the first side. The input area receives the image light emitted from the light source assembly at a first location on a surface of the output waveguide. The output waveguide expands the image light at least along two dimensions as light propagates within the waveguide between the first and second side. The output waveguide includes an output area that outputs a first portion of the expanded image light to an eyebox. The output waveguide includes a first diffractive element on the first side and a second diffractive element on the second side of the output waveguide, and the output area is located between the input area and the first and second diffractive elements. The first and second diffractive elements reflect a second portion of the expanded image light back toward the output area for outcoupling to the eyebox.

Note that conventional output waveguides do not include the diffractive elements discussed above. Some percentage of the image light (~10-20%) that is in coupled into a conventional output waveguide may not be decoupled from the output waveguide. Accordingly, a conventional waveguide display can have a lower density of replication of the received image light and/or may have rainbow artifacts in the viewable media presented to the user's eyes.

Figure 1:
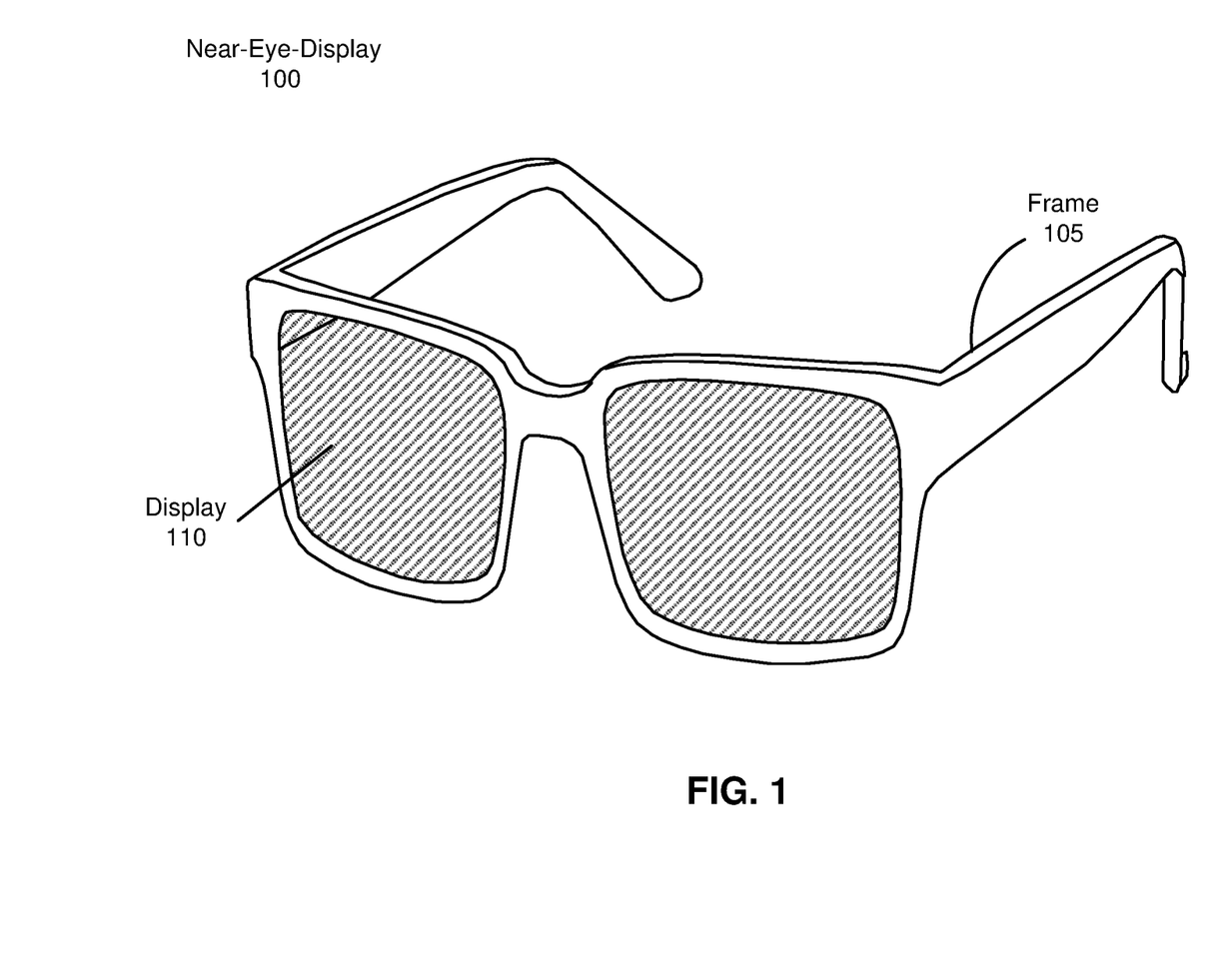
FIG. 1 is a diagram of a NED, in accordance with an embodiment.

FIG. 1 is a diagram of a near-eye-display (NED) 100, in accordance with an embodiment. In some embodiments, the NED 100 may be referred to as a head-mounted display (HMD). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may be part of, e.g., a virtual reality (VR) system, an augmented reality (AR) system, a mixed reality (MR) system, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIGS. 2-4, the display 110 includes at least one display assembly (not shown) for directing one or more image light to an eye of the user. The display assembly includes a waveguide display with a plurality of diffractive elements that reflect a portion of an expanded image light back toward the output area for outcoupling to the eyebox. Note that in the absence of the diffractive elements, when image light is coupled into the waveguide display, some percentage of the image light (~10-20%) is not diffracted and get absorbed by the waveguide display. Accordingly, the waveguide display will have a lower density of replication of the received image light.

Figure 2:
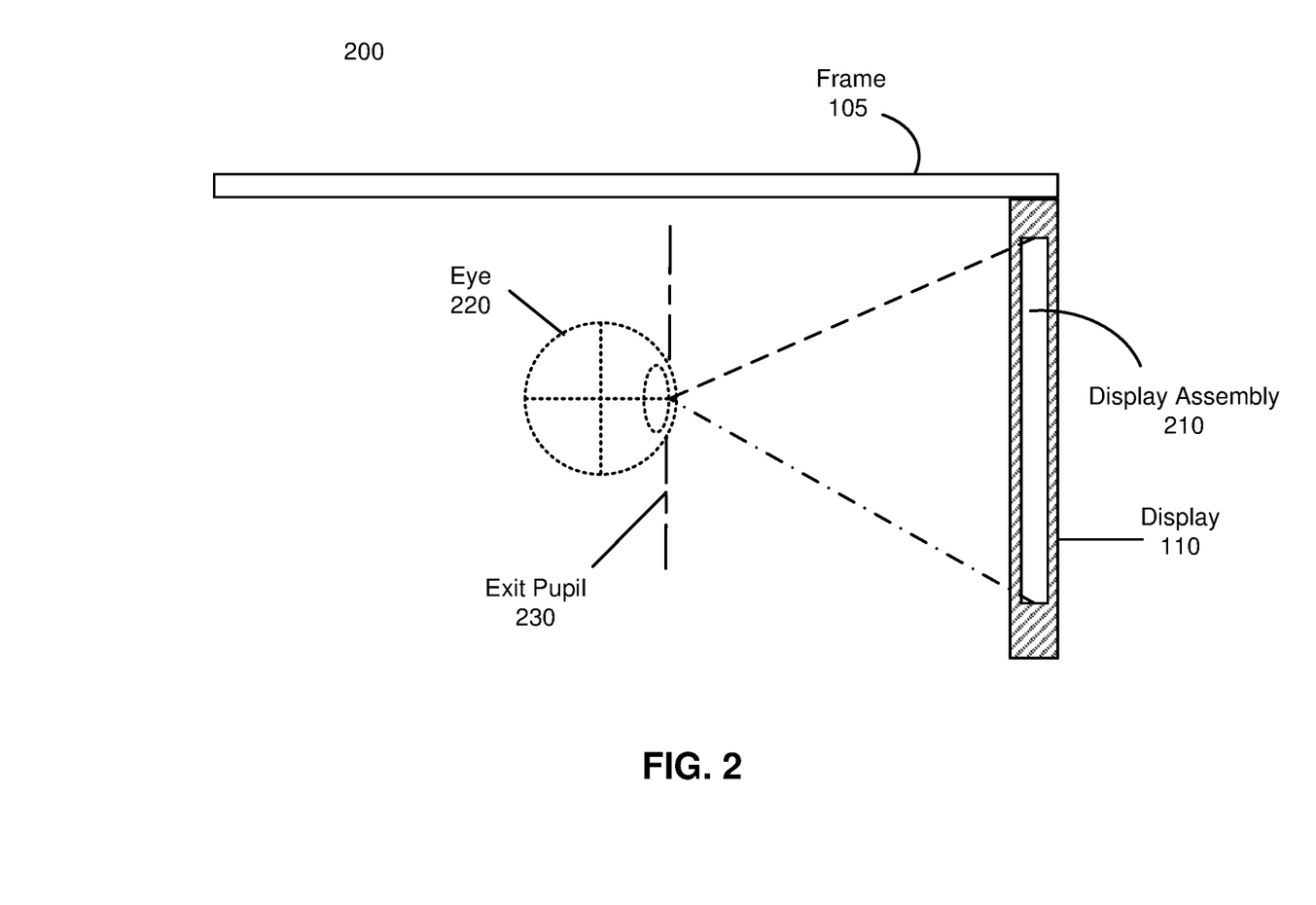
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned in an eyebox region when the user wears the NED 100. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to an eyebox located at an exit pupil of another eye 220 of the user.

The display assembly 210, as illustrated below in FIG. 2, is configured to direct the image light to an eyebox located at an exit pupil 230 of the eye 220. The display assembly 210 may be composed of one or more materials (e.g., plastic, glass, etc.) with one or more refractive indices that effectively minimize the weight and widen a field of view (hereinafter abbreviated as 'FOV') of the NED 100. As described below in conjunction with FIGS. 3 and 4, the display assembly 210 includes an output waveguide (not shown) with a plurality of diffractive elements located on both top and bottom sides at the end of the output waveguide that reflect a portion of an expanded image light back toward the output area for outcoupling to the eyebox. Such diffractive elements allow a portion of the received image light to be decoupled to the eyebox that would otherwise not decouple from the output waveguide (e.g., may be wasted as light absorbed by the surface of the output waveguide).

In some configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

Figure 3:
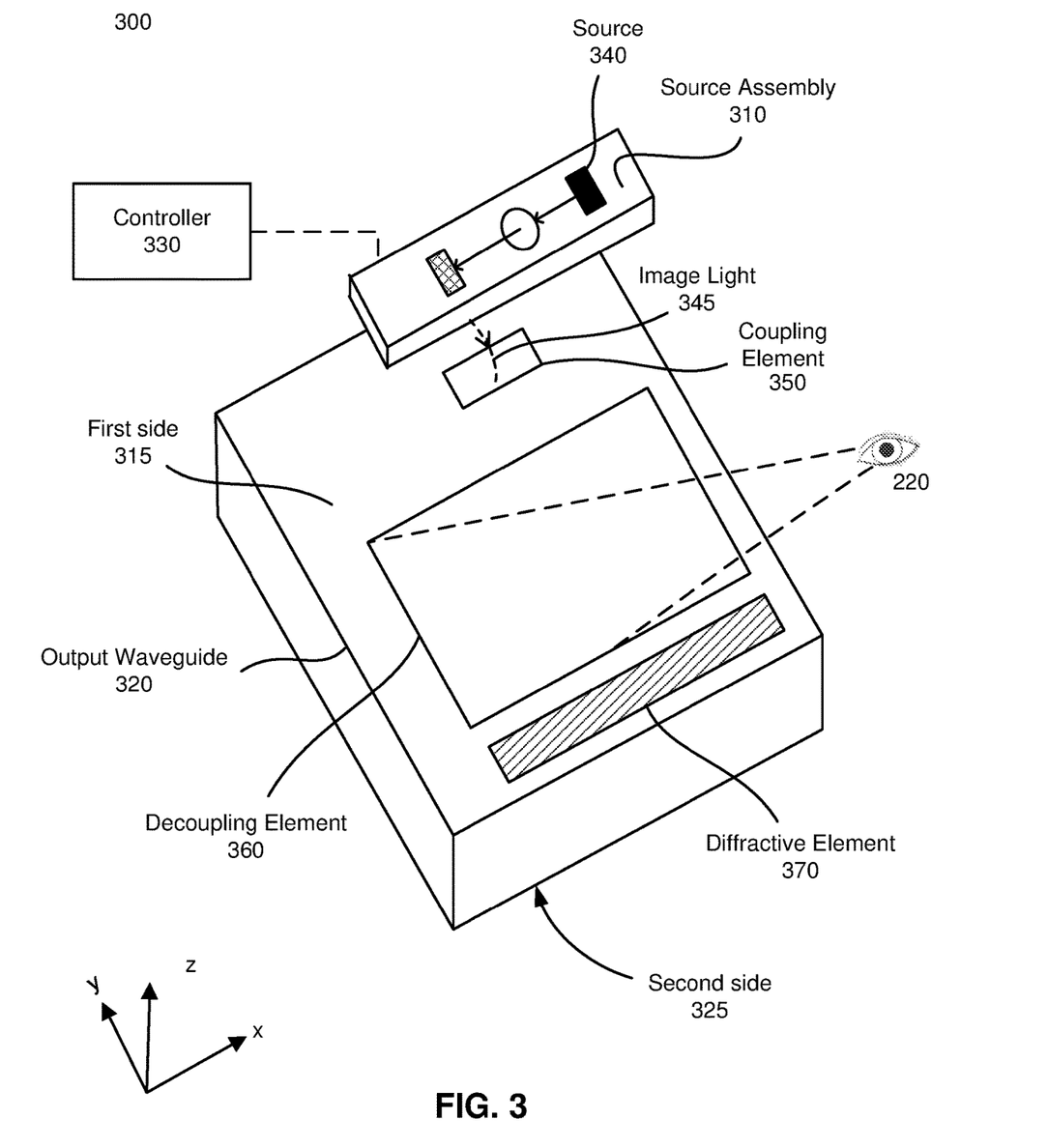
FIG. 3 illustrates an isometric view of a waveguide display with a source assembly, in accordance with an embodiment.

FIG. 3 illustrates an isometric view of a waveguide display 300 with a source assembly 310, in accordance with an embodiment. In some embodiments, the waveguide display 300 is a component (e.g., display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3A shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye. The source assembly 310 generates image light. The source assembly 310 includes a source 340 and an optics system (not shown here), as further described below with regard to FIG. 4. The source 340 is a source of light that generates at least a coherent or partially coherent image light. The source assembly 310 generates and outputs image light 345 to a coupling element 350 of the output waveguide 320.

The output waveguide 320 is an optical waveguide that outputs image light to an eye 220 of a user. The output waveguide 320 is associated with a pupil replication density which is a metric that characterizes the reproduction of a received image light after undergoing expansion in the body of the output waveguide 320. The output waveguide 320 receives the image light 345 at one or more coupling elements 350, and guides the received input image light to one or more decoupling elements 360. In some embodiments, the coupling element 350 couples the image light 345 from the source assembly 310 into the output waveguide 320. The coupling element 350 may be, e.g., a diffraction grating, a holographic grating, one or more cascaded reflectors, one or more prismatic surface elements, an array of holographic reflectors, and some combination thereof. For example, in embodiments where the coupling element 350 is diffraction grating, the pitch of the diffraction grating is chosen such that total internal reflection occurs, and the image light 345 propagates internally toward the decoupling element 360. For example, the pitch of the diffraction grating may be in the range of 300 nm to 600 nm.

The decoupling element 360 decouples the image light from the output waveguide 320. The decoupling elements 360 may be, e.g., a diffraction grating, or a holographic grating, one or more cascaded reflectors, one or more prismatic surface elements, an array of holographic reflectors, and some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 345 entering the coupling element 350. For example, the pitch of the diffraction grating may be in the range of 300 nm to 600 nm. In some configurations, the diffraction efficiency of the decoupling element 360 may be lowered by adjusting the height and/or slant angle of the decoupling element 360 to a target value, and/or by fabricating the decoupling element 360 using a resin of a substantially lower refractive index.

The decoupling element 360 decouples a first portion (not shown here) of the total internally reflected image light from the output waveguide 320 and decouples a second portion (not shown here) of the total internally reflected image light toward a diffractive element 370 located on the first side 315, as further described below with regard to FIG. 4. The diffractive element 370 is a diffraction grating, including but not restricted to, a surface relief grating, and a holographic grating. In some embodiments, the diffractive element 370 may be a diffraction grating coated with a metal, and the diffractive element 370 reflects the second portion of the total internally reflected image light toward the decoupling element 360, as described in detail below in conjunction with FIG. 4. For example, in embodiments where the diffractive element 370 is a diffraction grating coated with a metal (e.g. silver, aluminum, gold, etc.), the pitch of the diffractive element 370 is chosen such that a threshold value of a diffraction efficiency occurs for a target field of view (FOV). The diffractive element 370 may be located at a target distance from the decoupling element 360 such that the diffractive element 370 is not within the FOV of a user. The diffractive element 370 may be designed such that a substantially larger amount of the total internally reflected image light is diffracted back towards the decoupling element 360, and the decoupling element 360 decouples the total internally reflected image light out of the output waveguide 320. For example, the pitch of the metal-coated grating may be in the range of 300 nm to 600 nm.

The output waveguide 320 may be composed of one or more materials that facilitate total internal reflection of the image light 345. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 determines display instructions for the source assembly 310. Display instructions are instructions to render one or more images. In some embodiments, display instructions may simply be an image file (e.g., bitmap). The display instructions may be received from, e.g., a console of a VR system. Display instructions are instructions used by the source assembly 310 to generate image light 345. The display instructions may include, e.g., a type of a source of image light (e.g. monochromatic, polychromatic), a scanning rate, an orientation of a scanning apparatus, one or more illumination parameters (described below with reference to FIG. 4), and some combination thereof. The controller 330 includes a combination of hardware, software, and/or firmware not shown here so as not to obscure other aspects of the disclosure.

Figure 4:
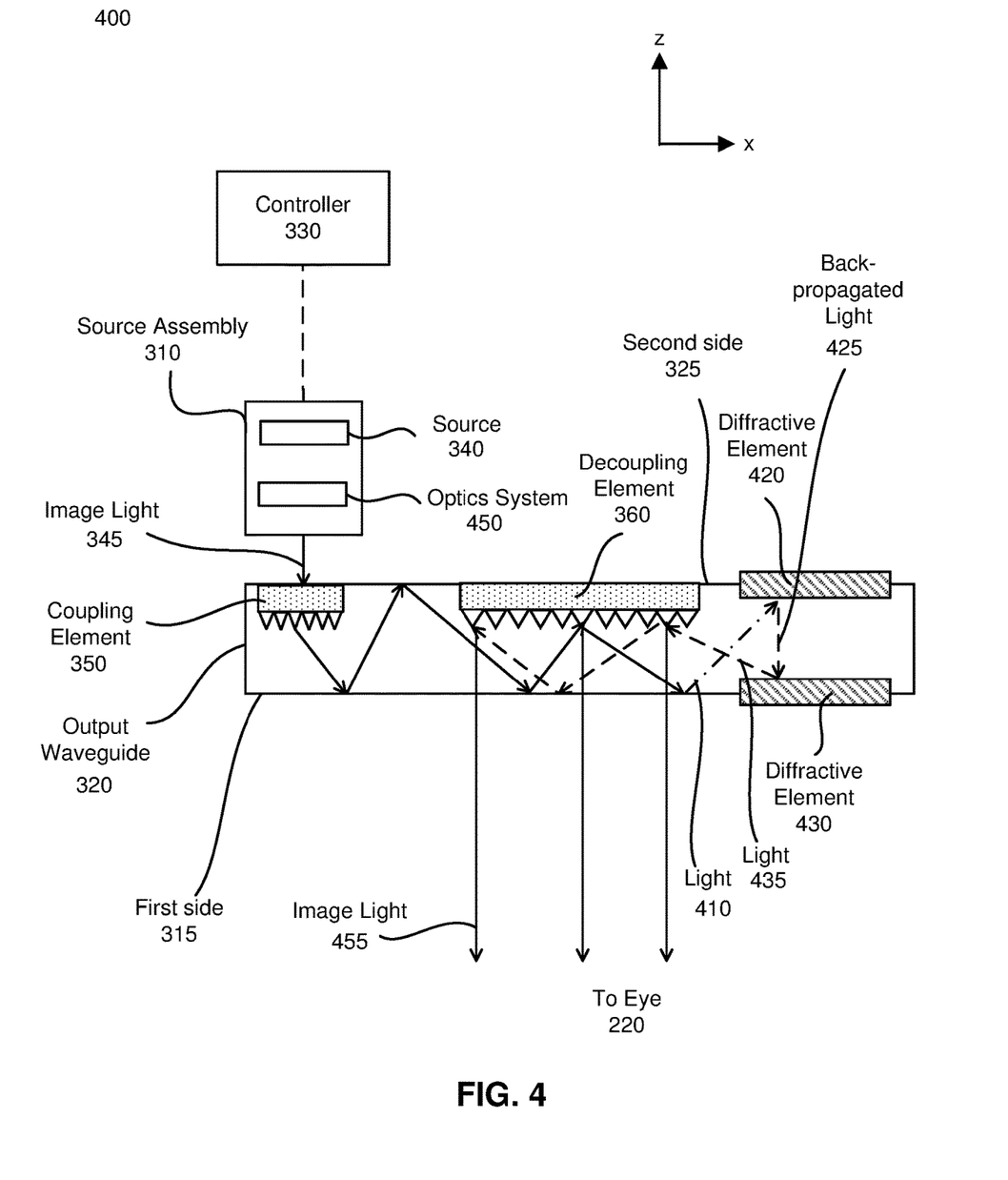
FIG. 4 illustrates a cross-section of the waveguide display of FIG. 3A with two diffractive elements, in accordance with an embodiment.

FIG. 4 illustrates a cross-section 400 of the waveguide display of FIG. 3A with two diffractive elements, in accordance with an embodiment. The cross-section 400 includes the source assembly 310, the output waveguide 320, and the controller 330. In alternate embodiments, the cross-section 400 includes the source assembly 310, the output waveguide 320, the controller 330, and the source waveguide 365 of FIG. 3B.

The source assembly 310 generates light in accordance with display instructions from the controller 330. The source assembly 310 includes a source 340, and an optics system 450. The source 340 is a source of light that generates at least a coherent or partially coherent image light. The source 340 may be, e.g., laser diode, a vertical cavity surface emitting laser, a light emitting diode, a tunable laser, or some other light source that emits coherent or partially coherent light. The source 340 emits light in a visible band (e.g., from about 390 nm to 700 nm), and it may emit light that is continuous or pulsed. In some embodiments, the source 340 may be a laser that emits light at a particular wavelength (e.g., 532 nanometers). The source 340 emits light in accordance with one or more illumination parameters received from the controller 330. An illumination parameter is an instruction used by the source 340 to generate light. An illumination parameter may include, e.g., source wavelength, pulse rate, pulse amplitude, beam type (continuous or pulsed), other parameter(s) that affect the emitted light, or some combination thereof.

The optics system 450 includes one or more optical components that condition the light from the source 340. Conditioning light from the source 340 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 310) is referred to as image light 345. The optics system 450 outputs the image light 345 toward the output waveguide 320.

The output waveguide 320 includes the coupling element 350, the decoupling element 360, a diffractive element 420, and a diffractive element 430. Each of the diffractive element 420 and the diffractive element 430 is an embodiment of the diffractive element 370, as described above in conjunction with FIG. 3A. In a different embodiment, the output waveguide 320 includes a second coupling element (not shown here) and a second decoupling element (not shown here) on the first side 315 of the output waveguide 320.

The output waveguide 320 receives the image light 345 emitted from the source assembly 310 at the coupling element 350. The coupling element 350 couples the image light 345 from the source assembly 310 into the output waveguide 320. For example, in embodiments where the coupling element 350 is diffraction grating, the pitch of the diffraction grating is chosen such that total internal reflection occurs, and the image light 345 propagates internally toward the decoupling element 360. In one example, the pitch of the diffraction grating may be in the range of 300 nm to 600 nm.

As shown in FIG. 4, a portion of the image light 345 undergoing total internal reflection inside the output waveguide 320 propagates toward the diffractive element 420 on the second side 325 as light 410. The light 410 is a portion of the image light 345 that is not initially decoupled by the decoupling element 360.

The diffractive element 420 and the diffractive element 430 act to reflect light back toward the decoupling element that was not initially decoupled. The diffractive element 420 and the diffractive element 430 may be composed of metals, including but not restricted to, silver, aluminum, etc. Areas of the diffractive elements 420 and 430 that are in contact with the output waveguide 320 are chosen such that a threshold value of a diffraction efficiency occurs for a target field of view (FOV). In some embodiments, the diffractive element 420 includes a plurality of metal-coated grating elements (not shown here) with a distance of separation.

The diffractive element 420 diffracts the light 410 as back-propagated light 425. The diffractive element 430 on the first side 315 diffracts the back-propagated light 425 from the diffractive element 420 toward the decoupling element 360. The decoupling element 360 receives the back-propagated light 425 and decouples the total internally reflected image light 455 from the output waveguide 320. In one example, when the light 410 has a power of 1.0 unit, the back-propagated light 425 may have a power of 0.9 unit, the light 435 may have a power of 0.8 units, and the total internally reflected image light 455 may have a power of 0.7 units. In the above example, in the absence of the diffractive element 420 and the diffractive element 430, there is a loss of 1 unit of power. In contrast, with the presence of the diffractive element 420 and the diffractive element 430, about 70% of the wasted energy is re-used by back-propagating the light 410 and out-coupling the image light 455. In some configurations, the decoupling element 360 may represent an exit pupil of the output waveguide 320. The dimension of the exit pupil may be limited by the optics system 450. In another configuration, the coupling element 350 and the decoupling element 360 may have the same dimensions in order to capture at least some of the image light 345 coupled in to the output waveguide 320. Note that in the absence of the diffractive element 420 and the diffractive element 430, the diffraction efficiency of the output waveguide 320 would be 50% and the replication density of the image light 345 would be increased by at least two times. In one example, for a target FOV, the replication density may be 1 pupil per millimeter in the absence of the diffractive element 420 and 430. In contrast, with the addition of the diffractive element 420 and the diffractive element 430, the replication density may be at least 2 pupil per millimeter. The diffractive element 420 and the diffractive element 430 reduce any rainbow artifacts in the total internally reflected image light 455 that present a viewable media to the user's eyes. In the embodiment of FIG. 4, the output waveguide 320 may have a uniform replication of the image light 345 from the source assembly 310 for a target FOV.

The controller 330 controls the source assembly 310 by providing display instructions to the source assembly 310. The display instructions cause the source assembly 310 to render light such that image light exiting the decoupling element 360 of the output waveguide 320 scans out one or more 2D images. For example, the display instructions may cause the source assembly 310 (via adjustments to optical elements in the optics system 450) to scan out an image in accordance with a scan pattern (e.g., raster, interlaced, etc.). The scanning instructions control an intensity of light emitted from the source 340, and the optics system 450 scans out the image by rapidly adjusting orientation of the emitted light. If done fast enough, a human eye integrates the scanned pattern into a single 2D image.

Figure 5:
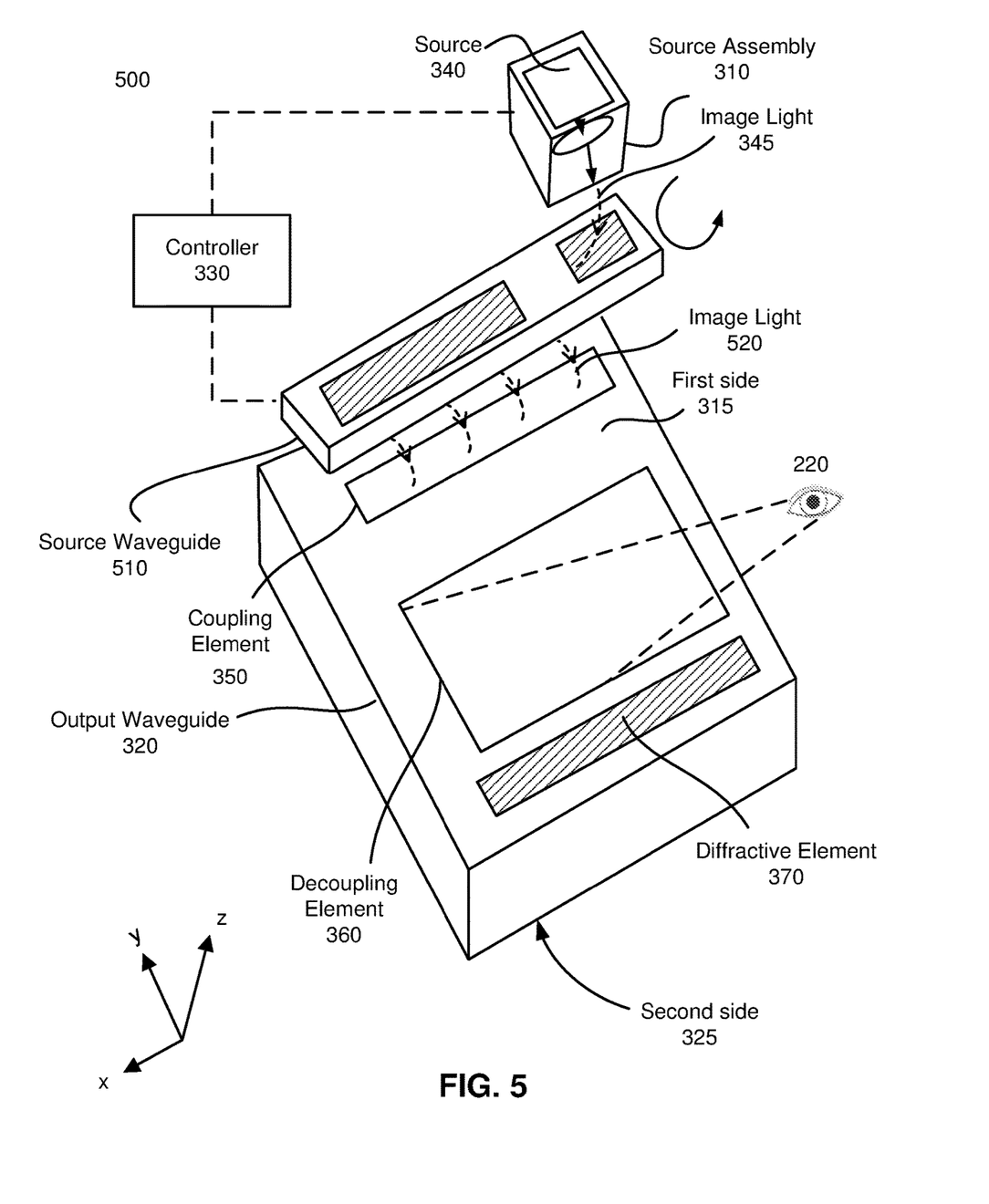
FIG. 5 illustrates an isometric view of a waveguide display with a source assembly and a source waveguide, in accordance with an embodiment.

FIG. 5 illustrates an isometric view of a waveguide display 500 with the source assembly 310 and a source waveguide 510, in accordance with an embodiment. In some embodiments, the waveguide display 500 is a component (e.g., display assembly 210) of the NED 100. In alternate embodiments, the waveguide display 500 is part of some other NED, or other system that directs display image light to a particular location.

The waveguide display 500 includes the source assembly 310, the output waveguide 320, the controller 330, and a source waveguide 510. The source assembly 310 generates image light 345. The source assembly 310 includes a source 340, details of which are described above with regard to FIG. 4. The source assembly 310 generates and outputs image light 345 to the source waveguide 510.

For purposes of illustration, FIG. 5 shows the waveguide display 500 associated with a single eye 220, but in some embodiments, another waveguide display separate (or partially separate) from the waveguide display 500, provides image light to another eye of the user. In a partially separate system, one or more components may be shared between waveguide displays for each eye.

The source waveguide 510 is an optical waveguide that receives image light at an input area and outputs expanded image light through an output area. In some embodiments, the source waveguide 510 includes a plurality of diffractive elements (not shown here) located on both top and bottom sides at the end of the source waveguide 510 that reflect a portion of an expanded image light back toward the output area for outcoupling to the eyebox. Such diffractive elements allow a portion of the received image light to be decoupled to the eyebox that would otherwise not decouple from the source waveguide 510. Accordingly, the source waveguide 510 will have a higher pupil replication density and a reduction of rainbow artifacts in the viewable media presented to the user's eyes 220. The source waveguide 510 receives the image light 345 generated by a source 340 of the source assembly 310. The source waveguide 510 reflects the received image light 345 and outputs image light 520 to the coupling element 350 of the output waveguide 320. In some embodiments, the source waveguide 510 performs a rotation along one dimension (e.g. X-dimension) while scanning the image light generated by the source 340. The source waveguide 510 may include an actuator assembly that performs the rotation of the source waveguide 510. The actuator assembly includes one or more mechanical actuators that perform a rotational motion in either clockwise or anti-clockwise direction at a specific frequency.

The output waveguide 320 receives the image light 355 at one or more coupling elements 350, and guides the received input image light to one or more decoupling elements 360. The decoupling element 360 decouples the image light from the output waveguide 320. The decoupling element 360 decouples a first portion (not shown here) of the total internally reflected image light from the output waveguide 320 and a second portion (not shown here) of the total internally reflected image light toward the diffractive element 370, as described above with regard to FIGS. 3 and 4.

The controller 330 determines display instructions for the source assembly 310 and the source waveguide 510. Display instructions are instructions to render one or more images. In some embodiments, display instructions may simply be an image file (e.g., bitmap). The display instructions may be received from, e.g., a console of a VR system. Display instructions are instructions used by the source assembly 310 to generate image light 345. Display instructions are instructions used by the source waveguide 510 to expand the image light 345 received from the source assembly 310. The display instructions may include, e.g., a type of a source of image light (e.g. monochromatic, polychromatic), a scanning rate of the source waveguide 510, an orientation of the source waveguide 510, one or more illumination parameters (described above with reference to FIG. 4), and some combination thereof. The controller 330 includes a combination of hardware, software, and/or firmware not shown here so as not to obscure other aspects of the disclosure.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide assembly comprising:
    an output waveguide comprising:
        a coupling element configured to receive image light;
        a waveguide body configured to expand the received image light as light propagates within the waveguide body;
        a decoupling element configured to output a first portion of the expanded image light, the decoupling element located on the output waveguide between the coupling element and a diffractive element; and
        the diffractive element configured to diffract a second portion of the expanded image light back toward the decoupling element for output.

2. The waveguide assembly of claim 1, wherein the diffractive element includes:
    a first diffractive element on a first side of the output waveguide and a second diffractive element on a second side of the output waveguide.

3. The waveguide assembly of claim 1, wherein the coupling element includes a first coupling element on a first side of the output waveguide and a second coupling element on a second side of the output waveguide.

4. The waveguide assembly of claim 3, wherein the first coupling element and the second coupling element are selected from a group consisting of: a diffraction grating, a holographic grating, one or more cascaded reflectors, one or more prismatic surface elements, an array of holographic reflectors, and some combination thereof.

5. The waveguide assembly of claim 1, further comprising:
    a light source assembly configured to emit the image light received by the coupling element.

6. The waveguide assembly of claim 5, further comprising:
    a source waveguide including an entrance area and an exit area, the source waveguide configured to receive the image light from the light source assembly at the entrance area, expand the image light in at least one dimension, and output an expanded image light from the exit area to the coupling element of the output waveguide.

7. The waveguide assembly of claim 5, wherein the waveguide assembly is incorporated into a near-eye display that includes a controller configured to generate display instructions and provide the display instructions to the light source assembly.

8. The waveguide assembly of claim 7, wherein the decoupling element includes a first decoupling element on a first side of the output waveguide and a second decoupling element on a second side of the output waveguide.

9. The waveguide assembly of claim 8, wherein the first decoupling element and the second decoupling element are selected from a group consisting of: a diffraction grating, a holographic grating, one or more cascaded reflectors, one or more prismatic surface elements, an array of holographic reflectors, and some combination thereof.

10. A waveguide assembly comprising:
    a light source assembly configured to emit image light;
    an output waveguide comprising:
        a coupling element configured to receive the image light;
        a waveguide body configured to expand the received image light as light propagates within the waveguide body;
        a decoupling element configured to output a first portion of the expanded image light, the decoupling element located on the output waveguide between the coupling element and a diffractive element; and
        the diffractive element configured to diffract a second portion of the expanded image light back toward the decoupling element for output.

11. The waveguide assembly of claim 10, further comprising:
    a source waveguide including an entrance area and an exit area, the source waveguide configured to receive the image light from the light source assembly at the entrance area, expand the image light in at least one dimension, and output an expanded image light from the exit area to the coupling element of the output waveguide.

12. The waveguide assembly of claim 10, wherein the diffractive element includes:
- a first diffractive element on a first side of the output waveguide; and
- a second diffractive element on a second side of the output waveguide.

13. The waveguide assembly of claim 12, wherein the first diffractive element and the second diffractive element are selected from a group consisting of: silver, aluminum, and some combination thereof.

14. The waveguide assembly of claim 10, wherein the waveguide assembly is incorporated into a near-eye display that includes a controller configured to generate display instructions and provide the display instructions to the light source assembly.

15. A output waveguide comprising:
- a coupling element configured to receive image light;
- a waveguide body configured to expand the received image light as light propagates within the waveguide body;
- a decoupling element configured to output a first portion of the expanded image light, the decoupling element located on the output waveguide between the coupling element and a diffractive element; and
- the diffractive element configured to diffract a second portion of the expanded image light back toward the decoupling element for output.

16. The output waveguide of claim 15, wherein the diffractive element includes:
- a first diffractive element on a first side of the output waveguide and a second diffractive element on a second side of the output waveguide.

17. The output waveguide of claim 15, wherein the coupling element includes a first coupling element on a first side of the output waveguide and a second coupling element on a second side of the output waveguide, and wherein the first coupling element and the second coupling element are selected from a group consisting of: a diffraction grating, a holographic grating, one or more cascaded reflectors, one or more prismatic surface elements, an array of holographic reflectors, and some combination thereof.

* * * * *